(12) United States Patent
Bregeault

(10) Patent No.: US 7,207,552 B2
(45) Date of Patent: Apr. 24, 2007

(54) HYDRAULIC DAMPING MOUNT, PARTICULARLY FOR MOUNTING AN AUTOMOTIVE ENGINE

(75) Inventor: Laurent Bregeault, St. Mars du Desert (FR)

(73) Assignee: Trelleborg Automotive Technical Centre GmbH, Höhr-Grenzhausen (DE)

( * ) Notice: Subject to any disclaimer, the term of this patent is extended or adjusted under 35 U.S.C. 154(b) by 0 days.

(21) Appl. No.: 11/125,552

(22) Filed: May 9, 2005

(65) Prior Publication Data

US 2005/0225016 A1  Oct. 13, 2005

Related U.S. Application Data

(63) Continuation of application No. PCT/EP03/12414, filed on Nov. 6, 2003.

(30) Foreign Application Priority Data

Nov. 7, 2002  (DE) .............................. 102 51 877

(51) Int. Cl.
*F16F 13/10* (2006.01)
(52) U.S. Cl. .................. 267/140.13; 267/562; 267/636
(58) Field of Classification Search ........... 267/140.11, 267/140.12, 140.13, 141, 141.1, 141.2; 248/562, 248/636, 564, 631
See application file for complete search history.

(56) References Cited

U.S. PATENT DOCUMENTS 2,991,992 A     7/1961  Elsner
4,458,888 A     7/1984  Wolf et al.
4,733,854 A *   3/1988  Miyamoto .............. 267/140.13
4,763,884 A     8/1988  Matsui et al. .......... 267/140.12
4,856,750 A     8/1989  Le Fol
4,946,147 A     8/1990  Kato et al.
5,044,813 A *   9/1991  Gregg .................... 267/140.12
5,172,893 A    12/1992  Bouhier et al. ......... 267/140.12
6,427,814 B1 *  8/2002  Miyamoto .................. 267/220
2002/0117788 A1 8/2002  West ..................... 267/140.12

FOREIGN PATENT DOCUMENTS

| DE | 37 29 563 A1 | 3/1988 |
| DE | 38 34 099 A1 | 4/1990 |
| DE | 4117130 A1 * | 11/1992 |
| DE | 100 64 330 A1 | 7/2002 |
| EP | 0 172 700 A1 | 2/1986 |
| EP | 0 326 504 A2 | 8/1989 |
| JP | 56 094 043 | 7/1981 |
| JP | 61218845 A * | 9/1986 |
| JP | 63 266 240 | 11/1988 |

* cited by examiner

*Primary Examiner*—Thomas Williams
(74) *Attorney, Agent, or Firm*—Laurence A. Greenberg; Werner H. Stemer; Ralph E. Locher (57) ABSTRACT

A hydraulic damping mount, particularly to mount an automotive engine, is formed with a support spring. The support spring is produced from an elastically deformable material and supports a mount core connected to a supporting arm. The mount is provided with a working chamber, defined by the support spring and which may be filled with a hydraulic fluid. A compensation chamber is connected to the working chamber by an overflow channel. The supporting arm is detachably connected to the mount core. The mount is characterized by a relatively simple and economic embodiment as the overflow channel is integrated in the supporting arm.

10 Claims, 10 Drawing Sheets

HYDRAULIC DAMPING MOUNT, PARTICULARLY FOR MOUNTING AN AUTOMOTIVE ENGINE

CROSS-REFERENCE TO RELATED APPLICATION

This is a continuing application, under 35 U.S.C. § 120, of copending international application No. PCT/EP2003/012414, filed Nov. 6, 2003, which designated the United States; this application also claims the priority, under 35 U.S.C. § 119, of German patent application No. 102 51 877.7, filed Nov. 7, 2002; the prior applications are herewith incorporated by reference in their entirety.

BACKGROUND OF THE INVENTION

FIELD OF THE INVENTION

The invention relates to a hydraulic damping mount serving particularly to mount an automotive engine. The mount is provided with a support spring made of an elastomeric material for supporting a mount core connectable to a supporting arm. In addition the mount is provided with a working chamber defined by the support spring for filling with a hydraulic fluid. The mount contains furthermore a compensation chamber connected to the working chamber by an overflow channel. Such hydro mounts satisfy the combined requirements for a relatively low stiffness for high-frequency vibration, particularly in the audible range, and a relatively high stiffness for low-frequency, large-amplitude vibration. This is why such hydro mounts find application for mounting an automotive engine so as to, on the one hand, isolate audible vibration over a wide range and, on the other, to effectively damp low-frequency, large amplitude vibration caused, for instance, by road surface irregularities.

A hydraulic damping mount configured as a dual-chamber hydro mount is described in U.S. Pat. No. 4,946,147. The known hydro mount contains a working chamber defined by a support spring and which is separated from a compensation chamber by a partition plate. Vulcanized in the support spring is a mount core containing an orifice for receiving a supporting arm connected to the engine. Provided in a partition plate is an overflow channel connecting the working chamber filled with hydraulic fluid with the compensation chamber. The damping action of the mount is primarily achieved by the inertia of the hydraulic fluid flowing between the working chamber and compensation chamber under dynamic loading. The damping response can thus be "tuned" by how the overflow channel is configured.

At high frequencies the overflow channel has no effect, because the hydraulic fluid is no longer able to follow the exciting vibration. This is why high-frequency vibration results in an increase in the pressure in the working chamber, increasing the dynamic stiffness of the mount. To compensate the negative effect of this on the damping response, the partition plate of the known mount is provided with a decoupling diaphragm, which responds to small-amplitude vibration in thus preventing a transfer of hydraulic fluid between the working chamber and compensation chamber. By contrast, large-amplitude vibration results in the decoupling diaphragm being mechanically blocked and thus in a transfer of hydraulic fluid through the overflow channel. Accordingly, due to the decoupling diaphragm, damping small-amplitude vibration, as occurs in the audible range, is decoupled from vibration of larger amplitude as is often encountered in the low-frequency range.

The drawback in the known hydraulic damping mount is its manufacture, which is relatively cost-intensive. The main reason for this is the partition plate separating the working chamber from the compensation chamber and which, because of the overflow channel and decoupling diaphragm, result in a complex configuration. Apart from this, the partition plate is relatively complicated to install.

SUMMARY OF THE INVENTION

It is accordingly an object of the invention to provide a hydraulic damping mount, particularly for mounting an automotive engine, that overcomes the above-mentioned disadvantages of the prior art devices of this general type, which has a relatively simple and cost-effective configuration.

With the foregoing and other objects in view there is provided, in accordance with the invention, a hydraulic damping mount. The mount contains a mount core, and a supporting arm releasably connected to the mount core and has an overflow channel. The supporting arm and the mount core define a compensation chamber. A support spring made of an elastomeric material is provided and supports the mount core. The supporting spring defines a working chamber to be filled with a hydraulic fluid, and the compensation chamber is connected to the working chamber by the overflow channel.

To achieve the object it is provided that the hydraulic damping mount now has the supporting arm releasably connected to the mount core and the overflow channel is integrated in the supporting arm.

The mount in accordance with the invention is the result of having discovered the benefits of disposing the overflow channel connecting the working chamber to the compensation chamber in the supporting arm by which the mount is secured for instance, to an automotive engine. This achieves a simple and cost-effective structure since it eliminates a separate assembly for partition of the working chamber from the compensation chamber and for accommodating the overflow channel. The supporting arm, which is usually cast, and releasably connected to the mount core now makes it possible to configure the overflow channel in various configurations in thus enabling the response of the mount to be "tuned" to the particular application by replacing the supporting arm. The mount in accordance with the invention can thus be used for mounting a variety of engines simply by adapting the supporting arm and the overflow channel integrated therein. This thus takes into account a cost-effective modular structure for good economy.

Thus, advantageously the mount core has a through-hole into which the supporting arm is insertable. Inserting the supporting arm into the through-hole makes for simple replacement of the supporting arm. A form-locking connection resulting from the polygonal configuration of the through-hole between the supporting arm and the mount core assists in ensuring reliable securement of the supporting arm to the mount core. A form-locking connection is one that connects two elements together due to the shape of the elements themselves, as opposed to a force-locking connection, which locks the elements together by force external to the elements.

It is furthermore of advantage to close off the through-hole at one end by a flexible wall, the compensation chamber being defined by the flexible wall and an end face of the supporting arm when the supporting arm is inserted in the through-hole in thus achieving a highly compact assembly.

To achieve, on the one hand, good securement of the supporting arm to the mount core and, on the other, precise positioning of the supporting arm in the through-hole, the through-hole is preferably provided with a protuberance engaging a recess with a form-locking connection when the supporting arm is inserted in the through-hole, the recess being disposed at a side face of the supporting arm. The protuberance latching in the recess on inserting the supporting arm into the through-hole produces a form-locking connection in the longitudinal direction of the supporting arm assisting precise positioning of the supporting arm in the through-hole.

In one preferred aspect of the mount in accordance with the invention the overflow channel contains an inlet port leading into the working chamber, an outlet port leading into the compensation chamber and a flow passage interconnecting the inlet port and outlet port and extending preferably spirally in the supporting arm. The spiral configuration of the flow passage ensures for a compact assembly a relatively long fluid column and thus effective damping of low-frequency vibration and large-amplitude vibration.

Advantageously the inlet port is disposed at a bottom face of the supporting arm facing the working chamber and the outlet port at an end face of the supporting arm for an expedient construction of the mount. It is furthermore expedient to configure the working chamber rotationally symmetrical in forming a funnel conically tapered towards the inlet port, the funnel assisting in a load exerted on the support spring being effectively communicated to the hydraulic fluid in the working chamber to port the hydraulic fluid through the overflow channel as a function of the frequency and amplitude of the load.

In another advantageous aspect of the mount in accordance with the invention a decoupling diaphragm is provided accommodated in a cage incorporated in the supporting arm, the cage being connected via a decoupling passage to the working chamber. The decoupling diaphragm decouples small-amplitude vibrations by these motioning or deforming the decoupling diaphragm in thus preventing a flow of hydraulic fluid through the overflow channel. The decoupling passage leading to the decoupling diaphragm results in high-frequency, small amplitude vibration, causing the hydraulic fluid in the decoupling passage to vibrate at a frequency approximating the natural frequency of the support spring. The resulting resonance causes a reduction in the dynamic stiffness in a certain frequency spectrum for "tuning" the isolation capacity of the mount in this frequency spectrum.

Preferably the cage is open at an upper end of the supporting arm facing away from the working chamber and is preferably provided with guiding faces for guiding portions of the decoupling diaphragm. This open configuration of the cage at the upper end of the supporting arm makes it easy to insert the decoupling diaphragm into the cage. Furthermore assisting installation are the guiding faces of the cage, which cooperate with the guiding portions of the decoupling diaphragm to ensure defined insertion of the decoupling diaphragm into the cage. It is furthermore advantageous to provide the cage with protuberances defining the motion of the decoupling diaphragm in ensuring a prescribed oscillating motion and deformation of the decoupling diaphragm.

Other features which are considered as characteristic for the invention are set forth in the appended claims.

Although the invention is illustrated and described herein as embodied in a hydraulic damping mount, particularly for mounting an automotive engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawing in detail and first, particularly, to FIGS. 1–6 thereof, there is shown a hydraulic damping mount which serves to hydraulically support an automotive engine. The mount contains a support spring 10 made of an elastomeric material. The support spring 10 is disposed on a rigid base plate 50 made of metal, preferably aluminum and secured to the body of the motor vehicle. The support spring 10 is furthermore connected to a supporting arm 30 likewise made of metal, preferably aluminum, which is secured to the engine of the motor vehicle.

Vulcanized in the support spring 10 is a mount core 13 containing a through-hole 14 of approximately rectangular cross-section. Inserted in the through-hole 14 is the supporting arm 30. To reliably connect the supporting arm 30 to the mount core 13 the through-hole 14 is provided with a non-illustrated protuberance to engage a recess 35 of the supporting arm 30 in a positive connection. The recess 35 is disposed at a side face 32 of the supporting arm 30, as is particularly evident from FIG. 4.

In the region of the mount core 13 the support spring 10 is provided with two buffers 16, 17 extending perpendicularly to the longitudinal direction of the supporting arm 30. The buffers 16, 17 cooperate with stoppers of a non-illustrated housing surrounding the support spring 10 and secured to the base plate 50. For securing the housing made of metal the base plate 50 is provided with tabs 53, as particularly evident in FIG. 3. The tabs 53 permit precise positioning of the housing on the base plate 50 and are disposed in addition to fastening holes 54 serving to join the housing as well as to secure the base plate 50 to the body of the motor vehicle.

Figure 1:
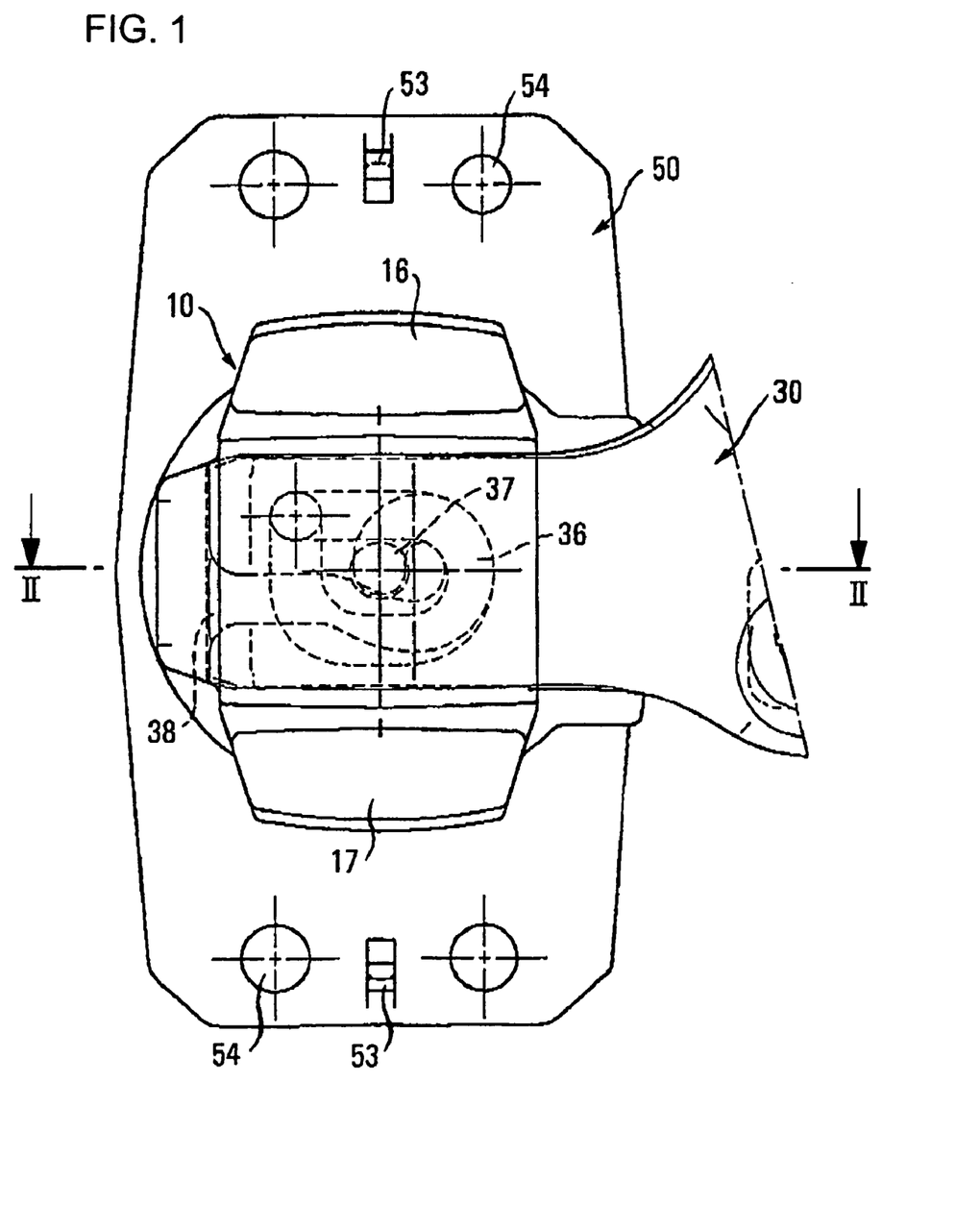
FIG. 1 is a diagrammatic, plan view of a first embodiment of a hydraulic damping mount according to the invention.
Figure 2:
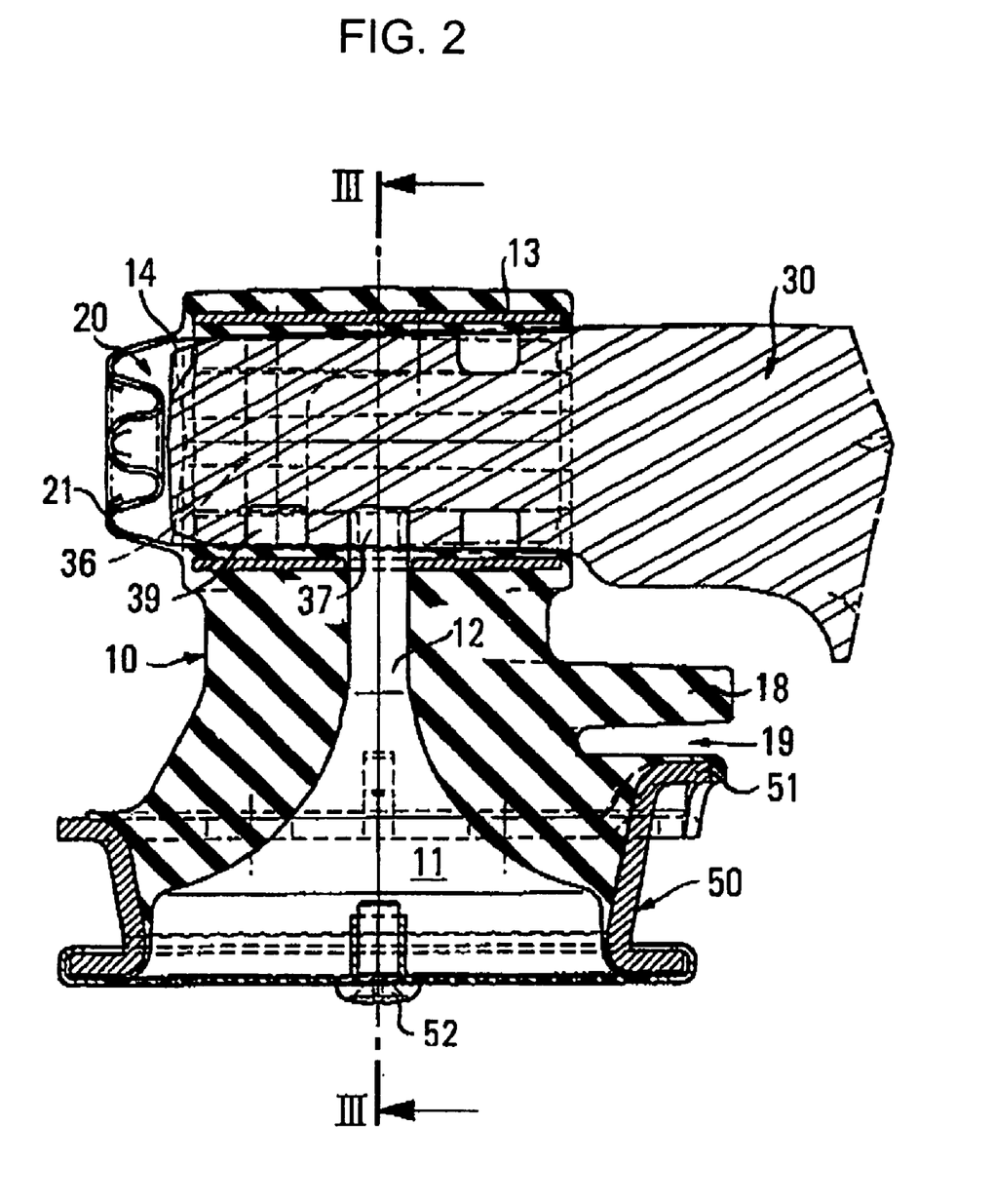
FIG. 2 is a sectional view of the hydraulic mount taken along the line II—II shown in FIG. 1.
Figure 3:
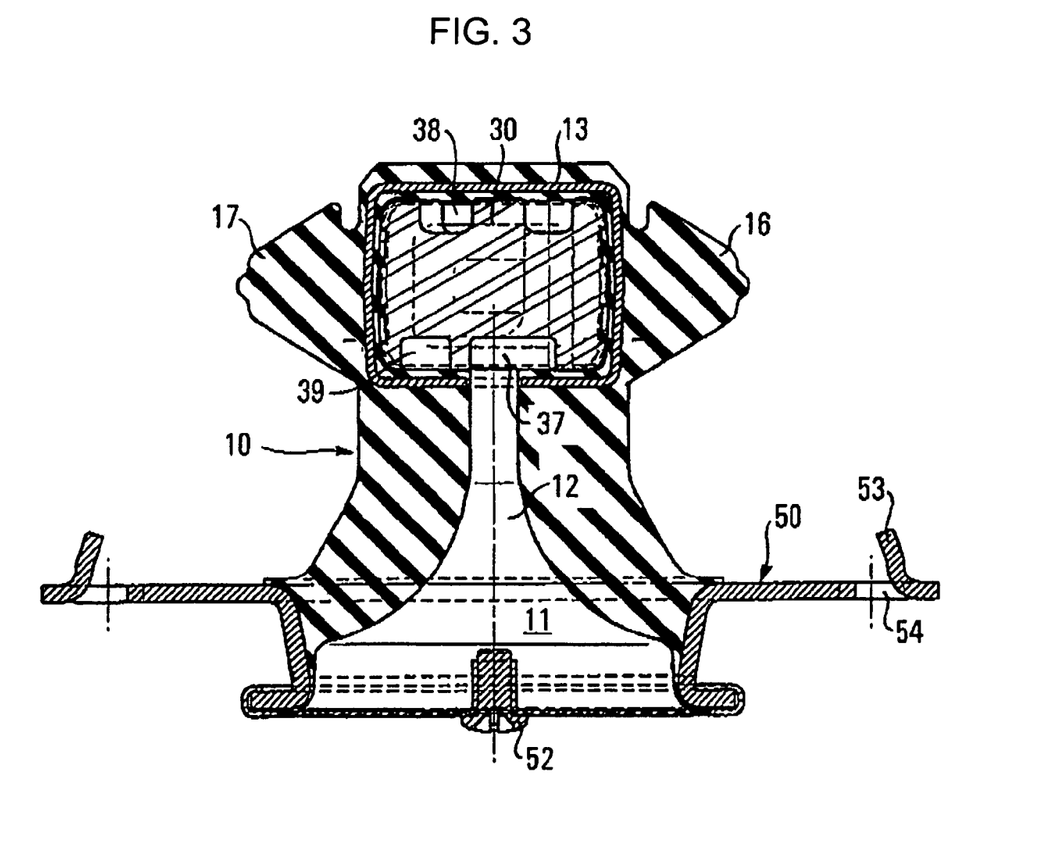
FIG. 3 is a sectional view of the hydraulic mount taken along the line III—III shown in FIG. 2.
Figure 4:
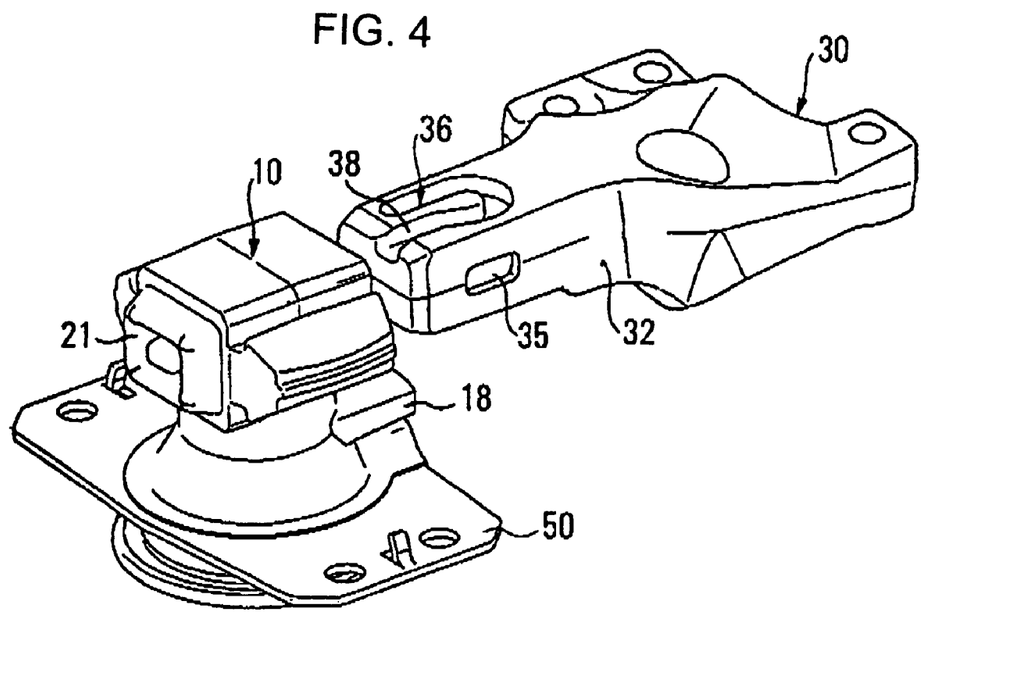
FIG. 4 is a perspective view of the mount as shown in FIG. 1, featuring a supporting arm separate from a mount core.
Figure 5:
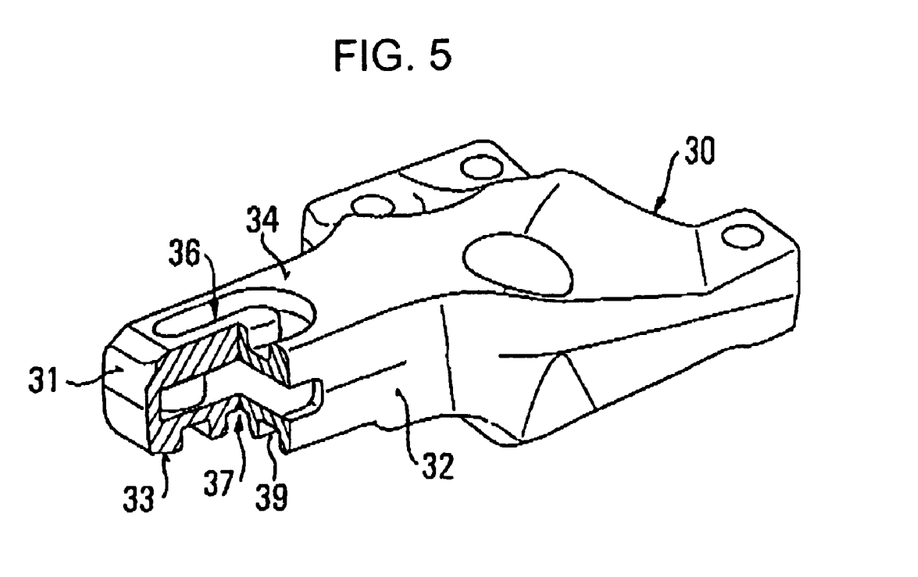
FIG. 5 is a perspective view of the supporting arm as shown in FIG. 4.
Figure 6:
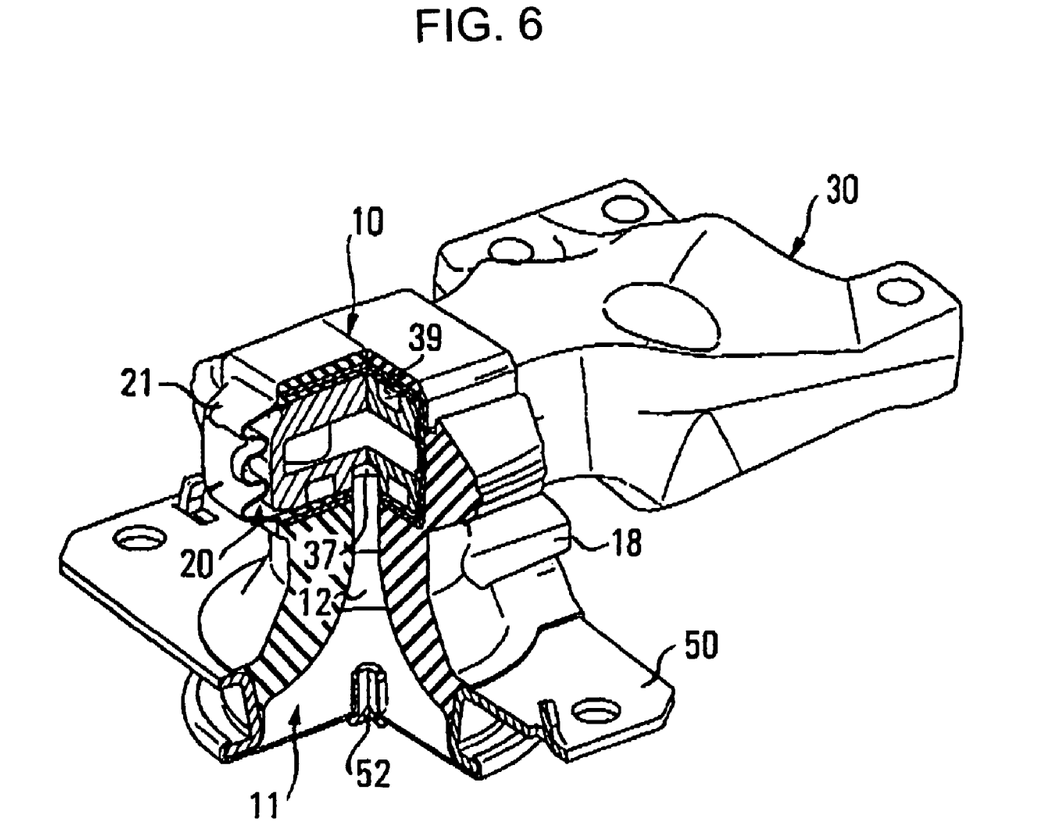
FIG. 6 is a perspective view as shown in FIG. 4 featuring the supporting arm inserted in the mount core.
Figure 7:
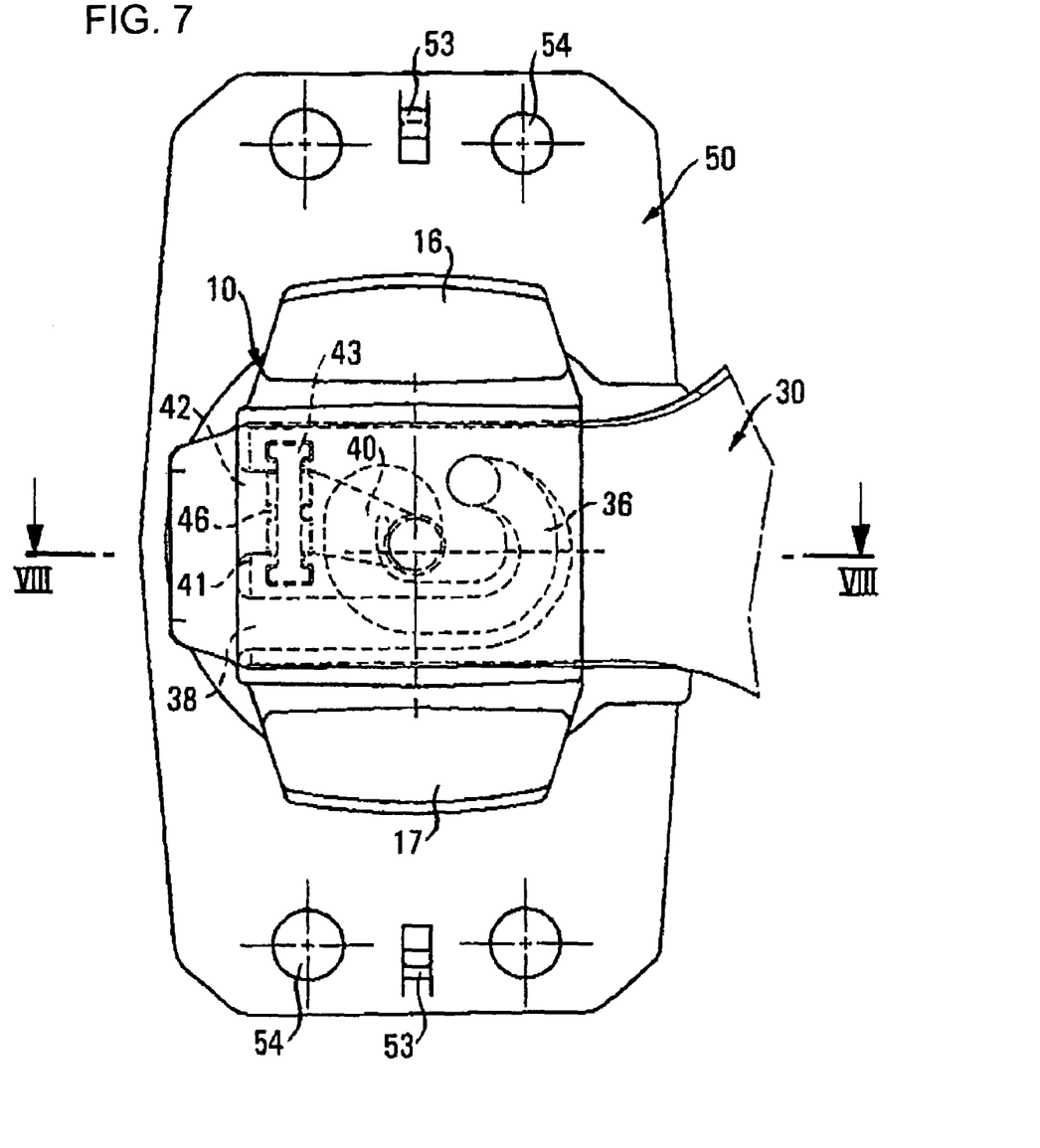
FIG. 7 is a plan view of a second embodiment of the hydraulic damping mount according to the invention.
Figure 8:
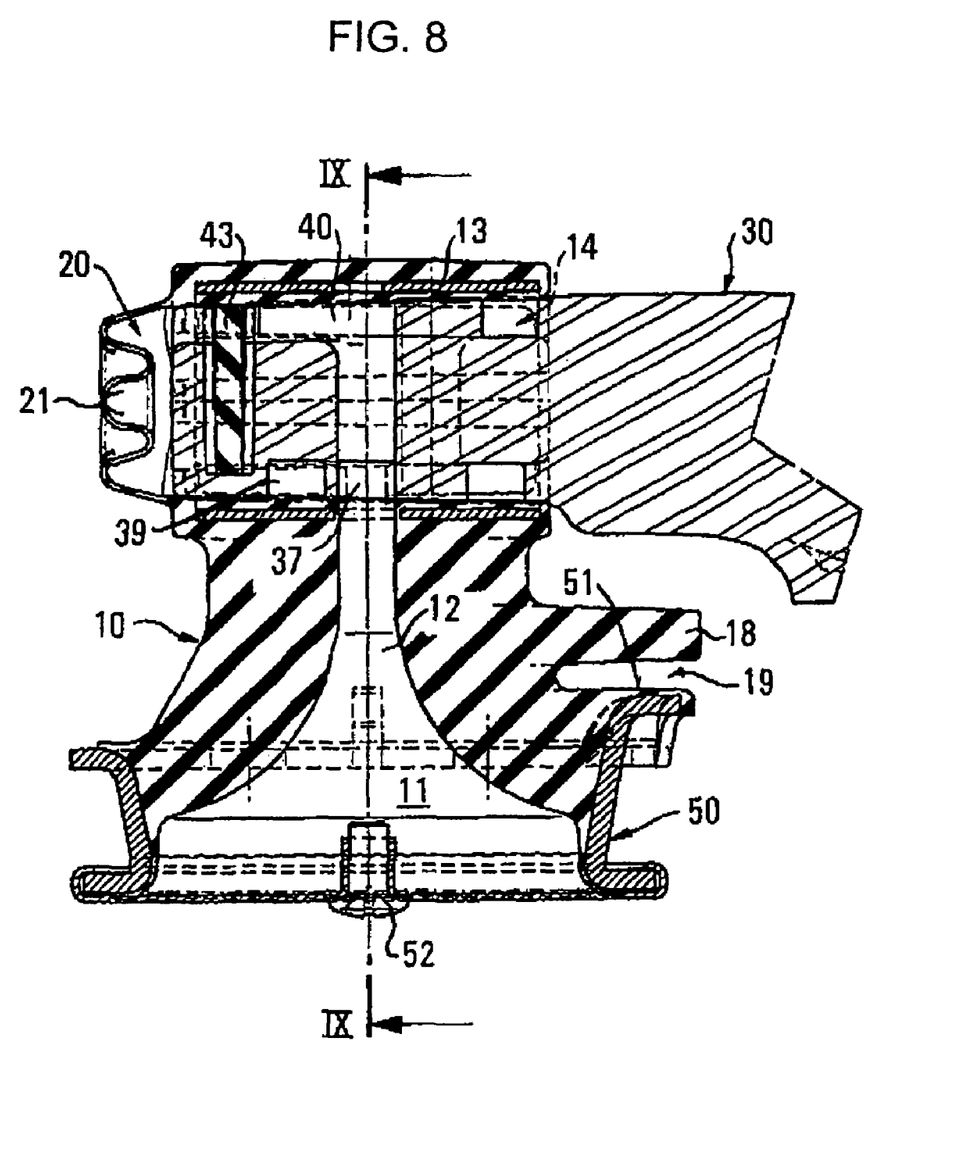
FIG. 8 is a sectional view of the damping mount taken along the line VIII—VIII shown in FIG. 7.
Figure 9:
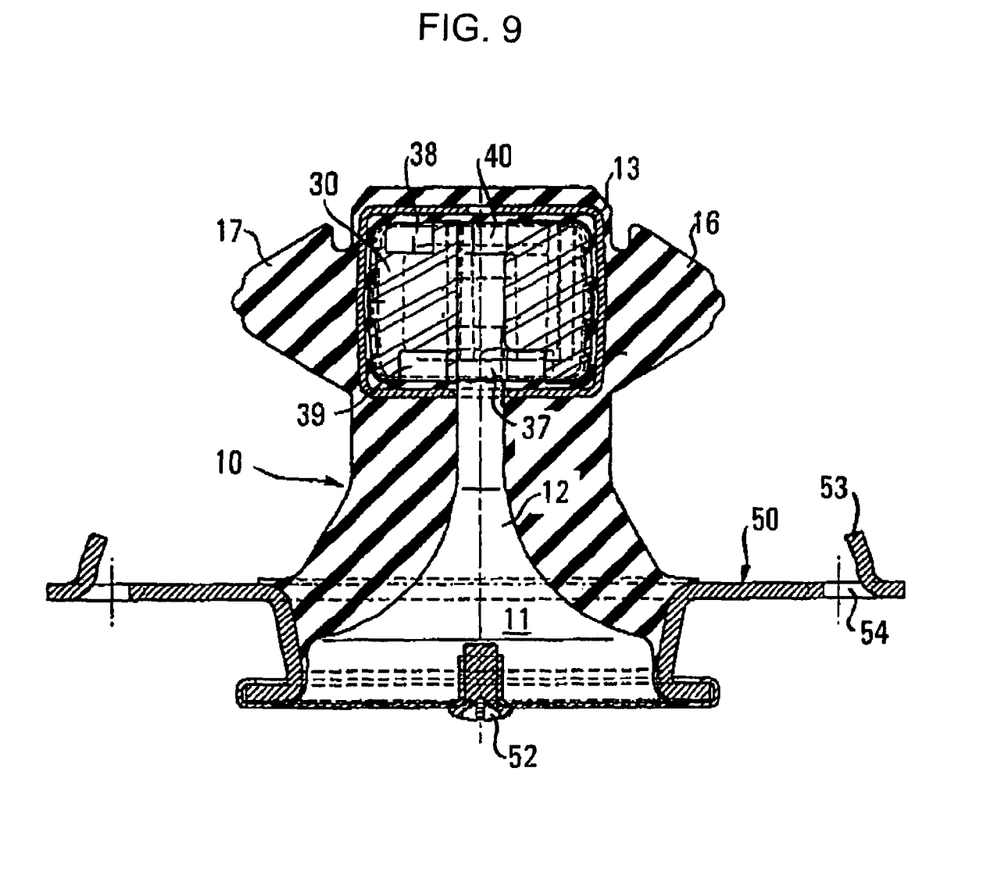
FIG. 9 is a sectional view of the damping mount taken along the line IX—IX in FIG. 8.

As particularly evident from FIGS. 2, 3 and 6 the support spring 10 defines a working chamber 11 filled with a hydraulic fluid. The working chamber 11 is connected to a compensation chamber 20 by an overflow channel 36. When the supporting arm 30 is inserted in the through-hole 14 the compensation chamber 20 is located between an end face 31 of the supporting arm 30 and a flexible wall 21, which closes off the through-hole 14 at one end. The overflow channel 36 configured in the supporting arm 30 contains an inlet port 37 porting into the working chamber 11, an outlet port 38 porting into the compensation chamber 20 and a flow passage 39 interconnecting the inlet port 37 and outlet port 38. The flow passage 39 extends spirally in the supporting arm 30, as is particularly evident from FIG. 1. The inlet port 37 is disposed at a bottom face 33 of the supporting arm 30 facing the working chamber 11, whereas the outlet port 38 is located at the end face 31 of the supporting arm 30. As particularly evident from FIGS. 2 and 3 the rotationally symmetrical configured working chamber 11 forms a funnel 12, which is conically tapered towards the inlet port 37.

Engine vibration communicated via the supporting arm 30 to the support spring 10, or for instance, body vibration of the motor vehicle caused by road surface irregularities as is relayed by the base plate 50 to the support spring 10, deforms the support spring 10 accordingly as transmitted to the hydraulic fluid in the working chamber 11. This results in the hydraulic fluid being displaced through the overflow channel 36 into the compensation chamber 20, the inertia of the hydraulic fluid flowing through the overflow channel 36 causing damping of the vibration. Any vibrations of excessive amplitude are additionally damped by the buffers 16, 17 cooperating with the stopper faces of the housing. In addition, the support spring 10 is provided with a protruding tongue 18, which, as particularly evident from FIG. 2, is distanced by a gap 19 from the stopper face 51 of the base plate 50 in thus buffering vibrations of excessive amplitude. Unlike the buffers 16, 17 the tongue 18 acts in the axial direction of the mount.

The hydraulic damping mount as shown in FIGS. 7 to 12 differs from the embodiment as described above by a decoupling diaphragm accommodated in a cage 41 which is integrated in the supporting arm 30, a decoupling passage 40 leading from the inlet port 37 to the cage 41. The cage 41 contains a decoupling orifice 42 porting into the compensation chamber 20. In addition, the cage 41 is configured open at an upper face 34 of the supporting arm 30 facing away from the working chamber 11. This open configuration of the cage 41 ensures facilitated insertion of the decoupling diaphragm 43, as evident from FIG. 10, for example. Inserting the decoupling diaphragm 43 is additionally facilitated by guide faces 44 of the cage 41 which, as evident from FIGS. 10 and 11, produce guidance of guide section 45 of the decoupling diaphragm 43.

Figure 10:
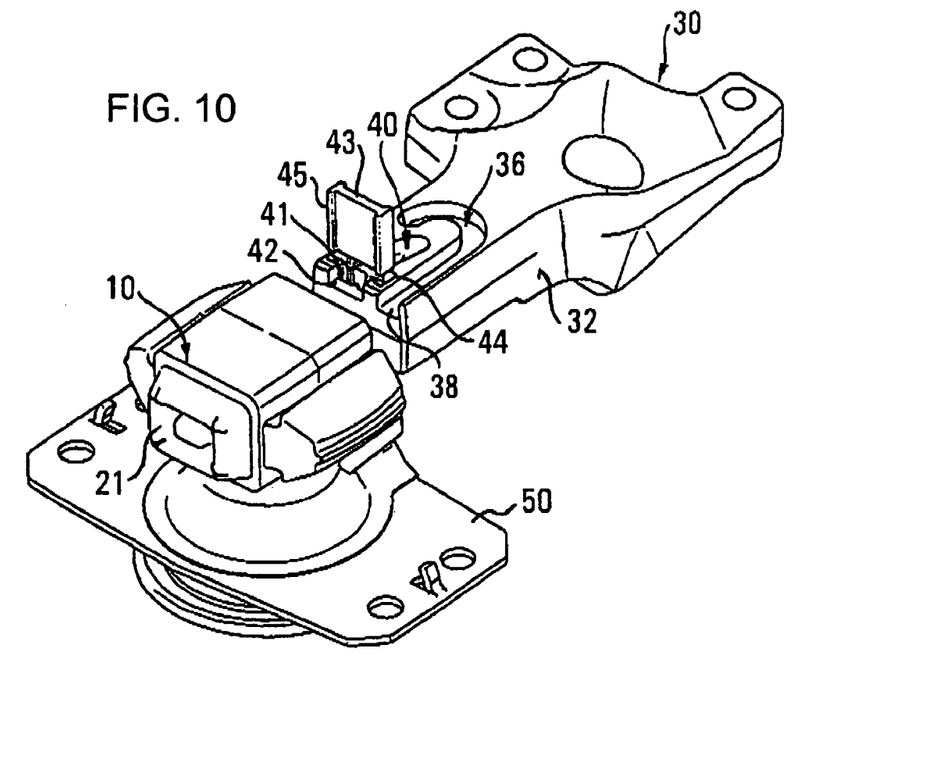
FIG. 10 is a perspective view of the mount as shown in FIG. 7, featuring the supporting arm separate from the mount core.
Figure 11:
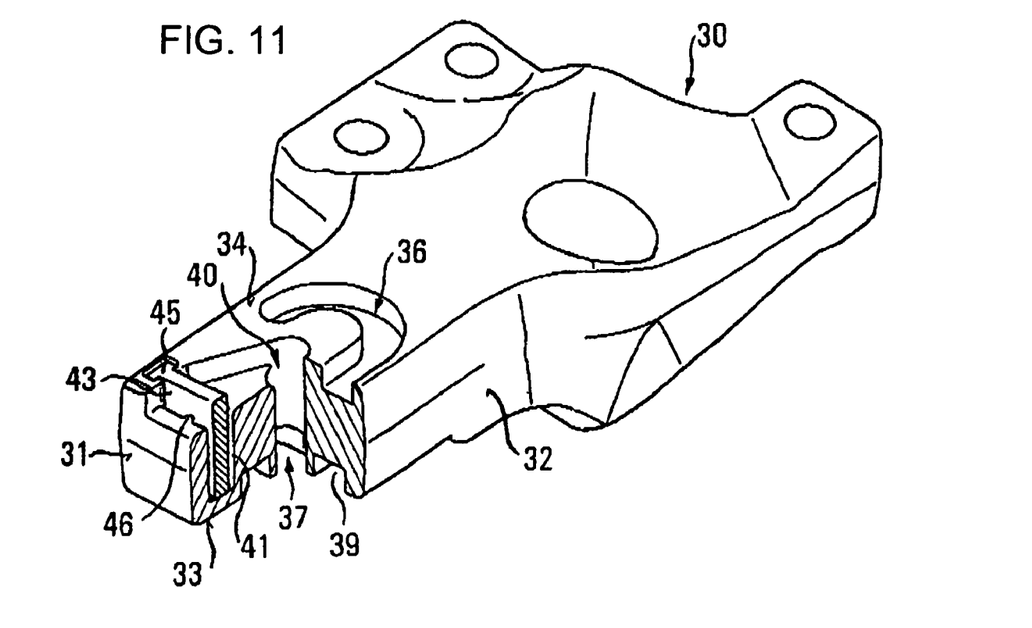
FIG. 11 is a perspective view of the supporting arm as shown in FIG. 10.
Figure 12:
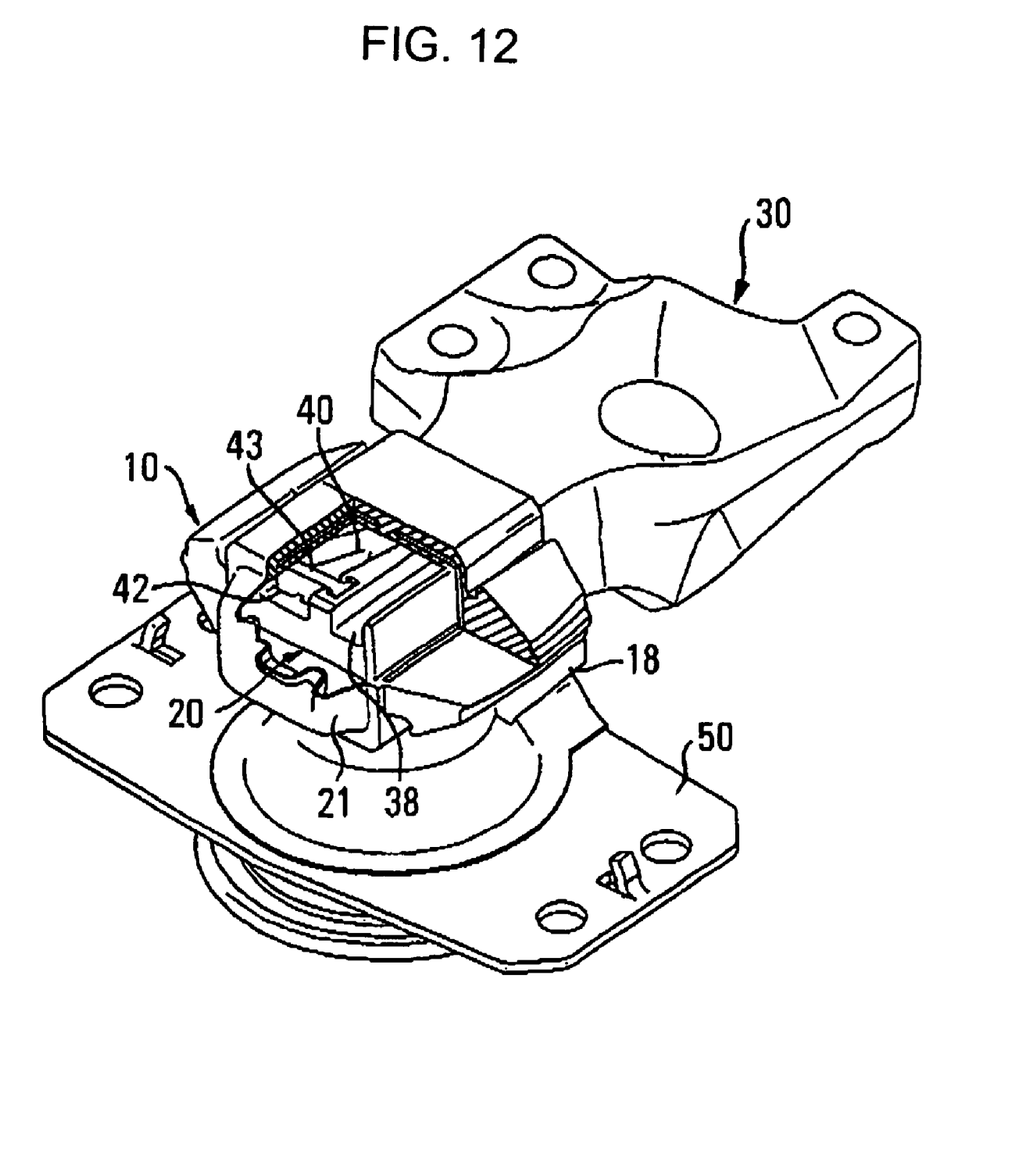
FIG. 12 is a perspective view of the mount as shown in FIG. 10 featuring the supporting arm inserted in the mount core.

The decoupling diaphragm 43 is deformed or motioned by small amplitude vibrations of the hydraulic fluid in the cage 41, the motion of the decoupling diaphragm 43 being definedly limited by protuberances 46 disposed in the cage 41. The decoupling diaphragm 43 thus assists in decoupling small-amplitude vibrations, which do not effect in a transfer of hydraulic fluid through the overflow channel 36. Transfer of hydraulic fluid is caused by large-amplitude vibrations as often occur in the low-frequency range. In addition, the decoupling passage 40 produces a reduction in the dynamic stiffness of the mount as is primarily due to the hydraulic fluid in the decoupling passage 40 being caused to resonate at natural frequencies of the support spring 10 because of high-frequency vibration.

The embodiment of a hydraulic damping mount as described above is characterized by a compact and cost-effective structure for good economy as is primarily due to the overflow channel 36 and the decoupling passage 40 including the cage 41 being integrated in the supporting arm 30 in thus eliminating a separate partition plate separating the working chamber from the compensation chamber as well as for locating the overflow channel. The supporting arm 30 replaceably connected to the mount core 13 makes for a modular configuration of the mount by the mount core 13 being compatible with differing supporting arms in thus making it possible to provide a decoupling passage 40 and a decoupling diaphragm or various configurations of the overflow channel 36 dictating the damping response of the mount without having to alter the function configuration of the support spring 10. Last but not least, an orifice for closing off by a screw plug 52 in the substantially trough-shaped base plate 50 facilitates filling the working chamber 11 and the compensation chamber 20 with hydraulic fluid.

I claim:

1. A hydraulic damping mount, comprising:
   a mount care having a flexible wall and a through-hole formed therein, said through-hole having an insertion end and an opposite end being opposite said insertion end, said opposite end being entirely closed of f by said flexible wall;
   a base plate configured to be mounted to a body of a motor vehicle;
   a supporting arm configured to be secured to a source of vibration and releasably connected to said mount core, said supporting arm being insertable into said through-hole through said insertion end, and said supporting arm having an end face facing said flexible wall;
   a support spring made of an elastomeric material, said support spring being disposed on said base plate and supporting said mount core;
   a working chamber formed in said support spring, said working chamber to be filled with a hydraulic fluid;
   a compensation chamber being defined by said flexible wall and said end face when said supporting arm is inserted in said through-hole; and
   an overflow channel formed in said supporting arm, said overflow channel having an inlet port porting into said working chamber, an outlet port porting into said compensation chamber, and a flow passage interconnecting said inlet port and said outlet port.

2. The hydraulic damping mount according to claim 1, wherein the hydraulic damping mount is an automotive engine mount.

3. The hydraulic damping mount according to claim 1, wherein said end face is substantially perpendicular to a longitudinal axis of said through-hole.

4. The hydraulic damping mount according to claim 1, wherein:
said supporting arm is connected to said mount core in a positively locked manner when said supporting arm is inserted in said through-hole.

5. The hydraulic damping mount according to claim 1, wherein said overflow channel extends spirally in said supporting arm.

6. The hydraulic damping mount according to claim 5, wherein said supporting arm has a bottom face facing said working chamber, and an upper face facing away from said working chamber, said inlet port is disposed at said bottom face and said outlet port is disposed at said end face of said supporting arm.

7. The hydraulic damping mount according to claim 6, wherein said working chamber is configured rotationally symmetrical, funnel shaped and conically tapering towards said inlet port.

8. The hydraulic damping mount according to claim 1, wherein said supporting arm has a cage, said cage having a decoupling passage formed therein and connected to said working chamber; and
further comprising a decoupling diaphragm accommodated in said cage.

9. The hydraulic damping mount according to claim 8, wherein:
said decoupling diaphragm has guiding sections; and
said cage is open at an upper face of said supporting arm facing away from said working chamber and has faces for guiding said guiding sections of said decoupling diaphragm.

10. The hydraulic damping mount according to claim 8, wherein said cage has protuberances defining a motion of said decoupling diaphragm.

* * * * *